United States Patent
Oshima et al.

(10) Patent No.: US 7,241,515 B2
(45) Date of Patent: Jul. 10, 2007

(54) ELECTRODE LAYER FOR THIN-FILM MAGNETIC HEADS

(75) Inventors: Masahiro Oshima, Niigata-ken (JP); Naoya Hasegawa, Niigata-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 353 days.

(21) Appl. No.: 10/842,885

(22) Filed: May 10, 2004

(65) Prior Publication Data

US 2004/0228042 A1    Nov. 18, 2004

(30) Foreign Application Priority Data

May 12, 2003    (JP) .............................. 2003-133312

(51) Int. Cl.
*G11B 5/127*    (2006.01)
(52) U.S. Cl. ...................... 428/815; 428/816; 428/661; 428/667; 360/110
(58) Field of Classification Search ............... None
See application file for complete search history.

(56) References Cited

U.S. PATENT DOCUMENTS

| | | | |
|---|---|---|---|
| 6,185,078 B1 | 2/2001 | Lin et al. | |
| 6,430,012 B1 | 8/2002 | Sano et al. | |
| 6,632,474 B1 * | 10/2003 | Horng et al. | 427/131 |
| 6,783,874 B2 * | 8/2004 | Hasegawa et al. | 428/811.2 |
| 7,061,730 B2 * | 6/2006 | Horng et al. | 360/322 |
| 2002/0135948 A1 * | 9/2002 | Funayama et al. | 360/324.1 |

FOREIGN PATENT DOCUMENTS

| | | |
|---|---|---|
| EP | 0 690 439 A1 | 1/1996 |
| EP | 0 938 079 A3 | 9/1999 |
| JP | 2002-25013 | 1/2002 |

OTHER PUBLICATIONS

Search Report dated Jul. 23, 2004 for Great Britain Application No. GB0410441.0.

* cited by examiner

Primary Examiner—Kevin M. Bernatz
(74) Attorney, Agent, or Firm—Brinks Hofer Gilson & Lione

(57) ABSTRACT

An electrode layer for thin-film magnetic heads includes a Ta base sub-layer, an Au sub-layer functioning as a main conductive sub-layer, and a protective sub-layer, those sub-layers being disposed in that order. An Au electrode seed sub-layer containing any one of NiFeCr, NiCr, and NiFe is placed between the Ta base sub-layer and the Au sub-layer. The Au electrode seed sub-layer has a thickness of 40 to 100 Å.

2 Claims, 3 Drawing Sheets

ELECTRODE LAYER FOR THIN-FILM MAGNETIC HEADS

This application claims the benefit of priority to Japanese Patent Application No. 2003-133312, herein incorporated by reference.

BACKGROUND OF THE INVENTION

1. Field of the Invention

The present invention relates to an electrode layer for thin-film magnetic heads.

2. Description of the Related Art

Thin-film magnetic heads include electrode layers for applying currents to magnetoresistive sensors and detect magnetic fields leaking from recording medium using a magnetic resistance effect when currents are applied to the magnetoresistive sensors via the electrode layers. In the thin-film magnetic heads, in order to minimize the electrical resistances of components other than the magnetoresistive sensors, the electrode layers preferably contain a metal material, such as Au, having a small resistivity. In general, a known electrode layer containing Au includes a Ta base sub-layer for preventing Au from diffusing, an Au sub-layer functioning as a main conductive layer, and a Ta protective sub-layer for preventing smear from occurring, those sub-layers being disposed in that order.

In the Ta/Au/Ta multilayer structure, since the Au sub-layer is inferior in electromigration (EM) resistance, Au atoms are ejected from the Au sub-layer because electrons moving in the electrode layer collide with the Au atoms. Therefore, there is a problem in that cavities are formed in the electrode layer while a current is applied to the electrode layer over a long period time, that is, a thin-film magnetic head is used over a long period time. The cavities formed in the electrode layer causes an increase in the electrical resistance of the electrode layer, although the electrode layer contains Au with low resistivity.

In order to improve the EM resistance, some electrode layers have a Ta/Cr/Au/Cr/Ta multilayer structure in which Cr sub-layers are each placed between the Au sub-layer and the corresponding Ta sub-layers. However, in the electrode layers having such a structure in which the Au sub-layer is adjacent to each Ta sub-layer, there is a problem in that heat treatment such as resist-curing or annealing causes an increase in the electrical resistance.

The above electrode layers are disclosed in the patent documents described below.

Japanese Unexamined Patent Application Publication No. 2002-25013

Japanese Unexamined Patent Application Publication No. 2002-208744

Japanese Unexamined Patent Application Publication No. 2002-299725

Japanese Unexamined Patent Application Publication No. 2002-319722

U.S. Pat. No. 6,430,012 B1

SUMMARY OF THE INVENTION

Accordingly, it is an object of the present invention to provide an electrode layer for thin-film magnetic heads. The electrode layer has a small electrical resistance, which is not increased by heat treatment.

The present invention discloses an electrode layer including a seed sub-layer used for preparing, for example, giant magnetoresistive sensors. The present invention has been made based on an assumption that the seed sub-layer placed under an Au sub-layer increases the crystal grain size of the Au sub-layer, whereby the electrical resistance of the electrode layer can be reduced.

According to the present invention, an electrode layer for thin-film magnetic heads includes a Ta base sub-layer, an Au sub-layer functioning as a main conductive sub-layer, and a protective sub-layer, those sub-layers being disposed in that order. An Au electrode seed sub-layer containing any one of NiFeCr, NiCr, and NiFe is placed between the Ta base sub-layer and the Au sub-layer.

The Au electrode seed sub-layer preferably has a thickness of 40 to 100 Å. The Au electrode seed sub-layer with such a thickness can increase the crystal grain size of the Au sub-layer, whereby the electrical resistance of the electrode layer is effectively reduced. When the thickness of the Au electrode seed sub-layer is less than 40 Å, the crystal grain size of the Au sub-layer is not increased even if the Au electrode seed sub-layer is placed under the Au sub-layer. In contrast, when the thickness thereof is more than 100 Å, a purpose that the thickness of the electrode layer is minimized cannot be achieved.

The electrode layer may further include a Cr sub-layer placed between the Au electrode seed sub-layer and the Au sub-layer and/or a Cr sub-layer placed between the Au sub-layer and the protective sub-layer. The Cr sub-layer has high adhesion to the Au sub-layer and enhances the EM resistance of the Au sub-layer.

In usual electrode layers including stacked Au sub-layers and Cr sub-layers, the electrical resistance of the electrode layers is increased by heat treatment. However, it has been confirmed that the electrical resistance of an electrode layer is not increased by heat treatment when the electrode layer includes an Au sub-layer and an Au electrode seed sub-layer, placed thereunder, having a thickness of 40 to 100 Å. This is because the Au electrode seed sub-layer probably increases the crystal grain size of the Au sub-layer, whereby the number of boundaries of Au crystal grains is reduced and the amount of Cr atoms migrating to the Au grain boundaries is therefore reduced.

As is clear from the above, when the Au electrode seed sub-layer having a thickness of 40 to 100 Å is placed between the Ta base sub-layer and the Au sub-layer, the electrical resistance of the electrode layer is small and is not increased by heat treatment. When the Au electrode seed sub-layer contains, for example, NiFeCr, the completed electrode layer has an electrical resistance that is about two-thirds of that of an electrode layer including no Au electrode seed sub-layer.

When the Ta base sub-layer is not placed under the Au electrode seed sub-layer, the crystal grain size of the Au sub-layer is not increased and the electrical resistance of the electrode layer is not therefore decreased even if the Au electrode seed sub-layer is placed under the Au sub-layer. Furthermore, the electrical resistance of the heat-treated electrode layer is higher than that of the untreated electrode layer. However, a base sub-layer containing at least one selected from the group consisting of Zr, Hf, W, and W—Ti is placed under the Au electrode seed sub-layer instead of the Ta base sub-layer, the same advantages as those of the electrode layer including the Ta base sub-layer can be obtained.

In the electrode layer, the protective sub-layer usually contains Ta and functions as a cap layer.

DESCRIPTION OF THE PREFERRED EMBODIMENTS

Figure 1:
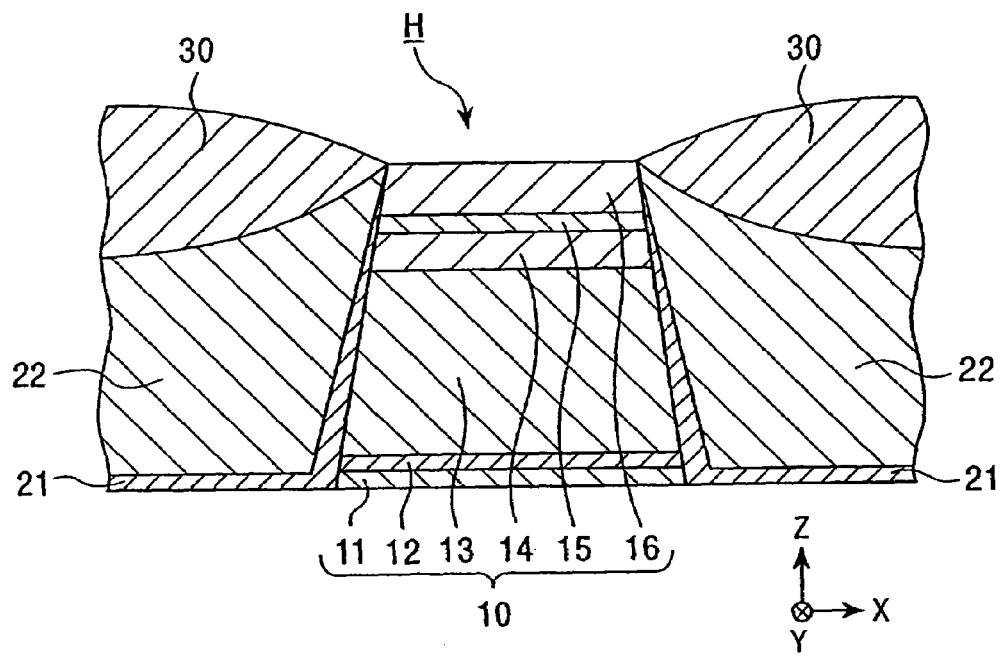
FIG. 1 is a vertical sectional view showing a thin-film magnetic head (GMR head) including an electrode layer according to an embodiment of the present invention when viewed from the side where a recording medium is placed.

FIG. 1 is a fragmentary sectional view showing a configuration of a thin-film magnetic head H including an electrode layer according to the present invention when viewed from the side where a recording medium is placed. With reference to FIG. 1, the X-direction is parallel to the width direction of a track, the Y-direction is parallel to the direction of a magnetic field leaking from the recording medium, and the Z-direction is parallel to the moving direction of the recording medium.

The thin-film magnetic head H includes magnetoresistive sensors 10 having a trapezoidal shape in cross section parallel to the Z-X plane, bias base layers 21, hard bias layers 22, and an electrode layer 30. The bias base layers 21 and the hard bias layers 22 are placed at both ends of each magnetoresistive sensor 10 when viewed in the X-direction (the width direction of a track). The electrode layer 30 lies over the hard bias layers 22. The magnetoresistive sensors 10 of this embodiment each include corresponding base layers 11, seed layers 12, antiferromagnetic layers 13, pinned magnetic layers 14, nonmagnetic layers 15, and free magnetic layers 16 and are referred to as a giant magnetoresistive (GMR) sensor. The magnetoresistive sensors 10 detect a magnetic field leaking from the recording medium when a current is applied to the magnetoresistive sensors 10 via the electrode layer 30. Insulating layers, lower shielding layers, and upper shielding layers, which are not shown, are disposed on and under the magnetoresistive sensors 10 in that order. The magnetoresistive sensors 10 may be anisotropic magnetoresistive (AMR) sensors using an anisotropic magnetoresistance effect.

Figure 2:
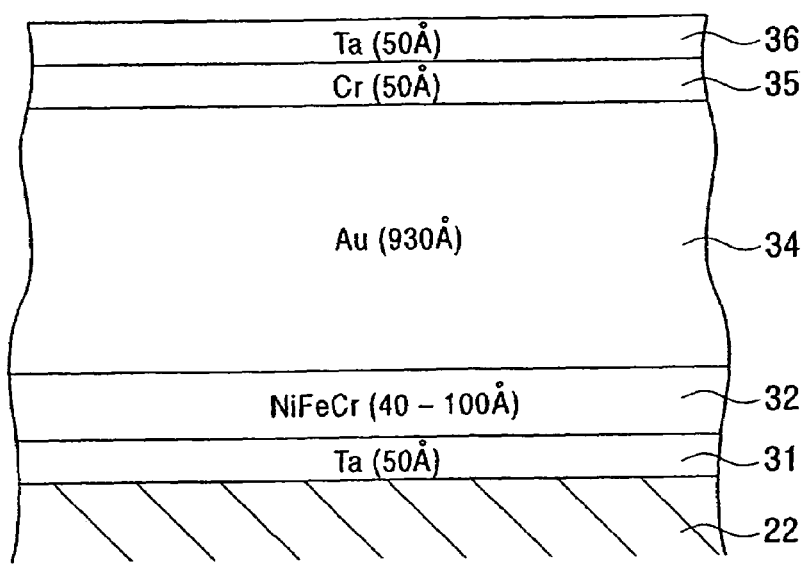
FIG. 2 is a schematic sectional view showing a configuration of the electrode layer shown in FIG. 1.

The electrode layer 30 principally contains Au. With reference to FIG. 2, the electrode layer 30 includes a Ta base sub-layer 31, an Au electrode seed sub-layer 32, an Au sub-layer 34, a Cr sub-layer 35, and a Ta protective sub-layer 36 disposed in that order. The Ta base sub-layer 31 prevents diffusion from occurring in the hard bias layers 22. The Cr sub-layer 35 that is securely joined to the Au sub-layer 34 prevents Au atoms from migrating out of the Au sub-layer 34, that is, the Cr sub-layer 35 prevents electromigration (EM). Since the Cr sub-layer 35 is placed on the Au sub-layer 34, the electrode layer 30 has high EM resistance; hence, a change in the electrical resistance of the electrode layer 30 is slight even if a current is applied to the electrode layer 30 over a long period of time. The Ta protective sub-layer 36 functions as a cap layer for the Au sub-layer 34 and prevents smear (blur) from occurring in the Au sub-layer 34 when a surface parallel to the X-Z plane is polished. The polished surface faces the recording medium.

Figure 3:
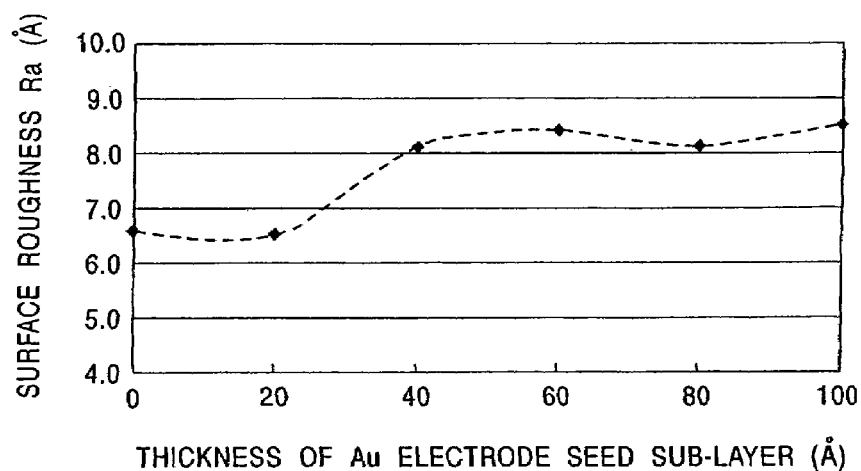
FIG. 3 is a graph showing the relationship between the surface roughness Ra of an Au sub-layer and the thickness of an Au electrode seed sub-layer.
Figure 6:
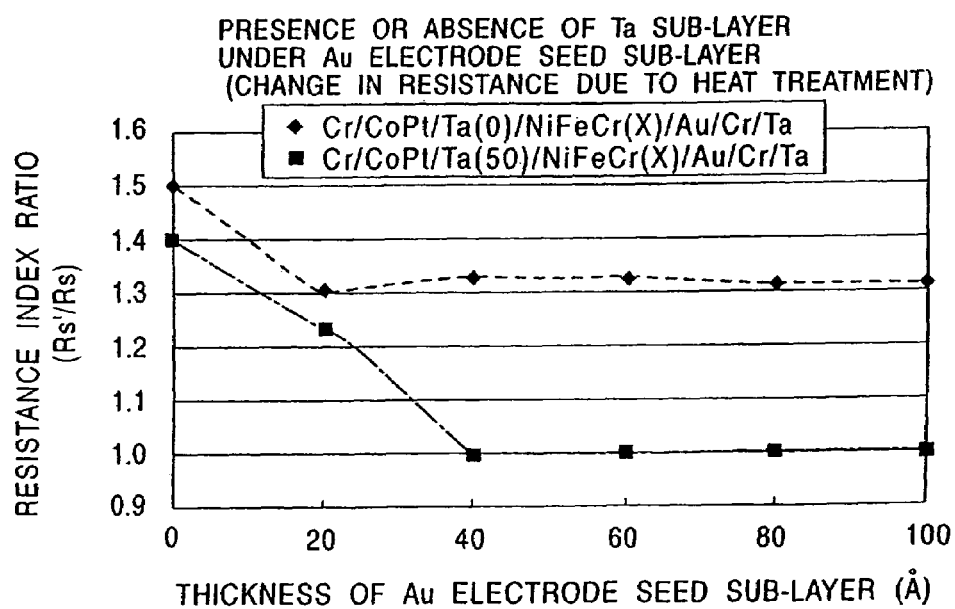
FIG. 6 is a graph showing the relationship between the ratio (Rs'/Rs) of a resistance index of the heat-treated electrode layer to a resistance index of the untreated electrode layer and the thickness of the Au electrode seed sub-layer.

In the electrode layer 30, the Au electrode seed sub-layer 32 contains NiFeCr. The Au electrode seed sub-layer 32 placed on the Ta base sub-layer 31 has a function of increasing the crystal grain size of the Au sub-layer 34 placed on the Au electrode seed sub-layer 32, as shown in FIG. 3. This function is herein referred to as "a seed effect". When the crystal grain size of the Au sub-layer 34 is increased due to the seed effect of the Au electrode seed sub-layer 32, the electrical resistance of the electrode layer 30 is decreased and is not varied by heat treatment as shown in FIG. 6. The reason why the electrical resistance of the electrode layer 30 is not varied by the heat treatment although the Cr sub-layer 35 is present on the Au sub-layer 34 is as follows: an increase in the crystal grain size of the Au sub-layer 34 decreases the number of boundaries between Au crystal grains and the amount of Cr present at the grain boundaries is therefore small.

The Au electrode seed sub-layer 32 preferably has a thickness of 40 to 100 Å. When the thickness thereof is less than 40 Å, the crystal grain size of the Au sub-layer 34 is not varied and the electrical resistance of the electrode layer 30 is not reduced but increased due to the heat treatment. When the thickness thereof is more than 100 Å, the following purpose cannot be achieved: steps between layers on which an upper gap layer is formed are reduced by minimizing the thickness of the electrode layer 30 of the thin-film magnetic head H, whereby the step coverage of the upper gap layer is enhanced, thereby preventing short circuits from occurring.

The electrode layer 30 shown in FIG. 2 is formed according to the following procedure: the bias base layers 21 are formed at both sides of the magnetoresistive sensors 10 when viewed in the X-direction of FIG. 1, the hard bias layers 22 are each formed on the corresponding bias base layers 21, and the electrode layer 30 is then formed over the hard bias layers 22. In particular, the Ta base sub-layer 31, the Au electrode seed sub-layer 32, the Au sub-layer 34, the Cr sub-layer 35, and the Ta protective sub-layer 36 are formed over the hard bias layers 22 in a vacuum atmosphere in that order, and unnecessary electrode portions and resist layers are then removed by a lift off process, whereby the electrode layer 30 is formed. In this embodiment, the Ta base sub-layer 31, the Cr sub-layer 35, and the Ta protective sub-layer 36 have a thickness of 50 Å, the Au sub-layer 34 has a thickness of 930 Å. The Au electrode seed sub-layer 32 has a thickness of 40 to 100 Å. After the electrode layer 30 is formed, heat treatment including UV curing and/or annealing is performed.

FIG. 3 is a graph showing the relationship between the surface roughness Ra of the Au sub-layer 34 and the thickness of the Au electrode seed sub-layer 32. In this embodiment, the thickness of the Au electrode seed sub-layer 32 is varied within a range of 0 to 100 Å, and the surface roughness Ra of the Au sub-layer 34 that has not been heat-treated is determined with a scanning atomic force microscope (AFM).

FIG. 3 illustrates that the surface roughness Ra is not varied when the thickness of the Au electrode seed sub-layer 32 is less than 20 Å, the surface roughness Ra is sharply increased when the thickness is within a range of 20 to 40

Å, and the surface roughness Ra is substantially constant when the thickness is 40 Å or more. That is, the Au electrode seed sub-layer 32 having a thickness of 40 Å or more exerts the seed effect on the Au sub-layer 34 to increase the crystal grain size and the increase in the crystal grain size of the Au sub-layer 34 causes an increase in the surface roughness Ra. When the Au electrode seed sub-layer 32 has a thickness of, for example, 80 Å, the surface roughness Ra is about 8.2 Å, which is about 28% larger than that of the Au sub-layer 34 under which the Au electrode seed sub-layer 32 is not placed.

Figure 4:
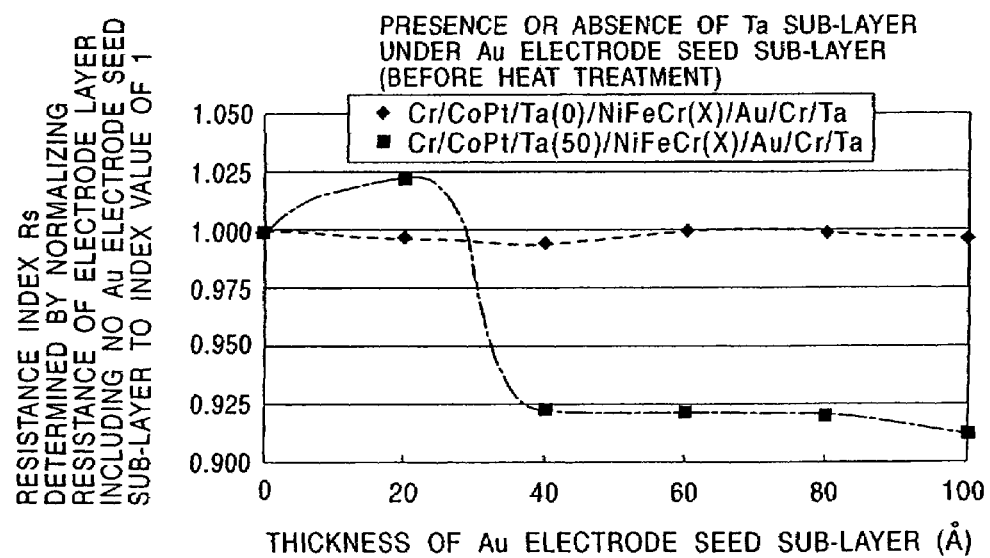
FIG. 4 is a graph showing the relationship between the resistance index Rs of the electrode layer that has not yet been heat-treated and the thickness of the Au electrode seed sub-layer.
Figure 5:
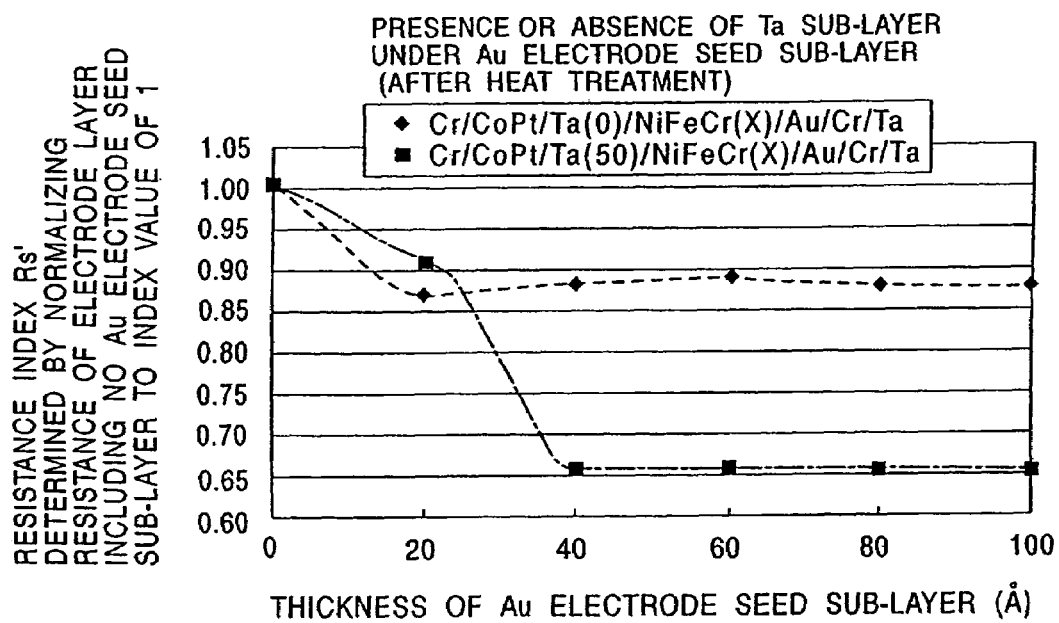
FIG. 5 is a graph showing the relationship between the resistance index Rs' of the heat-treated electrode layer and the thickness of the Au electrode seed sub-layer.

FIGS. 4 and 5 are graphs showing the relationship between the electrical resistance of the electrode layer 30 and the thickness of the Au electrode seed sub-layer 32. In the figures, square marks indicate values of the electrical resistance of the electrode layer 30 shown in FIG. 2. Furthermore, for the sake of comparison, diamond marks indicate values of the electrical resistance of the electrode layer 30 including no Ta base sub-layer 31. The hard bias layers 22 placed under the electrode layer 30 contain Co and Pt and have a thickness of 190 Å. The bias base layers 21 contain Cr and have a thickness of 50 Å.

The electrical resistance of the electrode layer 30 shown in FIGS. 4 and 5 is determined in such a manner that the thickness of the Au electrode seed sub-layer 32 in the electrode layer 30 is varied within a range of 0 to 100 Å. The electrical resistance is measured under the same conditions before and after the electrode layer 30 is heat-treated.

FIGS. 4 and 5 show the resistance indexes Rs and Rs', respectively, obtained by normalizing the electrical resistance of the electrode layer 30 including no Au electrode seed sub-layer 32 to an index value of 1 to convert measurements into index values. Therefore, the fact that the resistance index Rs or Rs' is larger than 1 means that the electrical resistance of the electrode layer 30 including the Au electrode seed sub-layer 32 is larger than that of the electrode layer 30 including no Au electrode seed sub-layer 32. In contrast, the fact that the resistance index Rs or Rs' is less than 1 means that the electrical resistance of the electrode layer 30 including the Au electrode seed sub-layer 32 is smaller than that of the electrode layer 30 including no Au electrode seed sub-layer 32.

FIG. 4 shows the measurement of the electrode layer 30 that has not yet been heat-treated. With reference to FIG. 4, the resistance index Rs of the electrode layer 30 decreases when the thickness of the Au electrode seed sub-layer 32 increases from 20 to 40 Å and is substantially constant when the thickness is 40 Å or more. The resistance index Rs of the electrode layer 30 including the Au electrode seed sub-layer 32 having a thickness of 40 Å or more is about 8% smaller than that of the electrode layer 30 including no Au electrode seed sub-layer 32. As is clear from this result, when the Au electrode seed sub-layer 32 is present under the Au sub-layer 34, the electrode layer 30 has a smaller resistance index Rs as compared with the electrode layer 30 including no Au electrode seed sub-layer 32. In order to minimize the resistance index Rs of the electrode layer 30, the Au electrode seed sub-layer 32 must have a thickness of 40 Å or more.

For the sake of comparison, with reference to data of the electrode layer 30 including no Ta base sub-layer 31, the resistance index Rs of the electrode layer 30 is substantially constant independently of the thickness of the Au electrode seed sub-layer 32, that is, the resistance index Rs is not varied. Therefore, when the Ta base sub-layer 31 is not present under the Au electrode seed layer 32, the resistance index Rs of the electrode layer 30 is not lowered even if the Au electrode seed sub-layer 32 is present under the Au sub-layer 34. Thus, in order to reduce the resistance index Rs of the electrode layer 30, the Ta base sub-layer 31 must be placed under the Au electrode seed sub-layer 32.

FIG. 5 shows the resistance index Rs' of the heat-treated electrode layer 30 used for determining the resistance index Rs shown in FIG. 4. The heat treatment includes photoresist curing performed at about 230° C. and annealing performed at about 210° C.

With reference to FIG. 5, the resistance index Rs' of the heat-treated electrode layer 30 decreases with an increase in the thickness of the Au electrode seed sub-layer 32 and becomes constant when the thickness of the Au electrode seed sub-layer 32 is 40 Å or more. In particular, when the thickness of the Au electrode seed sub-layer 32 is 40 Å or more, the resistance index Rs' is about 0.65, which is about 35% smaller than that of the electrode layer 30 including no Au electrode seed sub-layer 32. That is, the presence of the Au electrode seed sub-layer 32 under the Au sub-layer 34 causes a decrease in the resistance index Rs' as compared with the absence thereof. In order to minimize the resistance index Rs' of the heat-treated electrode layer 30, the Au electrode seed sub-layer 32 must have a thickness of 40 Å or more.

On the other hand, for the sake of comparison, with reference to data of the electrode layer 30 including no Ta base sub-layer 31, the resistance index Rs' of the heat-treated electrode layer 30 decreases when the thickness of the Au electrode seed sub-layer 32 increases to 20 Å and becomes constant when the thickness exceeds 20 Å. The resistance index Rs' of the heat-treated electrode layer 30 including the Au electrode seed sub-layer 32 having a thickness of 20 Å is about 13% smaller than that of the heat-treated electrode layer 30 including no Au electrode seed sub-layer 32. As is clear from this result, when the Ta base sub-layer 31 is not present under the Au electrode seed sub-layer 32, a decrease in the resistance index Rs' is smaller than that of the heat-treated electrode layer 30 including the Ta base sub-layer 31. Thus, in order to sufficiently reduce the resistance index Rs' of the heat-treated electrode layer 30, the Ta base sub-layer 31 must be placed under the Au electrode seed sub-layer 32.

FIG. 6 is a graph showing the change in the ratio of the resistance index Rs' of the heat-treated electrode layer 30 to the resistance index Rs of the untreated electrode layer 30. In FIG. 6 as well as FIGS. 4 and 5, square marks indicate values of the ratio Rs'/Rs of the electrode layer 30 shown in FIG. 2 and diamond marks indicate values of the ratio Rs'/Rs (comparative data) of the electrode layer 30 including no Ta base sub-layer 31.

With reference to FIG. 6, the ratio Rs'/Rs of the electrode layer 30 shown in FIG. 2 is larger than 1.0 when the thickness of the Au electrode seed sub-layer 32 is less than 40 Å and has a constant value of 1.0 when the thickness is 40 Å or more. That is, when the thickness of the Au electrode seed sub-layer 32 is less than 40 Å, the resistance index Rs' of the heat-treated electrode layer 30 is larger than the resistance index Rs of the untreated electrode layer 30. When the thickness of the Au electrode seed sub-layer 32 is more than 40 Å, the resistance index Rs' of the heat-treated electrode layer 30 is substantially equal to the resistance index Rs of the untreated electrode layer 30. As is clear from this result, when the Au electrode seed sub-layer 32 having a thickness of 40 Å or more is present under the Au sub-layer 34, the resistance index Rs' of the heat-treated electrode layer 30 is not larger than the resistance index Rs of the untreated electrode layer 30.

In contrast, when the thickness of the Ta base sub-layer 31 is zero, that is, when the electrode layer 30 does not include the Ta base sub-layer 31, the ratio Rs'/Rs of the electrode layer 30 is more than 1.0 independently of the thickness of the Au electrode seed sub-layer 32, which means that the resistance index Rs' of the heat-treated electrode layer 30 is larger than the resistance index Rs of the untreated electrode layer 30. When the Au electrode seed sub-layer 32 has a thickness of more than 20 Å, the resistance index Rs of the heat-treated electrode layer 30 is 30% larger than the resistance index Rs of the untreated electrode layer 30. The resistance index of the heat-treated electrode layer 30 including no Ta base sub-layer 31 is larger than that of the electrode layer 30 including the Ta base sub-layer 31. Thus, in order to suppress the increase in the resistance index of the electrode layer 30, the Ta base sub-layer 31 must be placed under the Au electrode seed sub-layer 32.

As is clear from FIGS. 4 to 6, in the electrode layer 30 including the Ta base sub-layer 31 and the Au electrode seed sub-layer 32, disposed under the Au sub-layer 34, having a thickness of 40 Å or more, the resistance is smaller than those of known electrode layers including no Au electrode seed sub-layer 32 and is not increased by the heat treatment.

According to the comparison between FIG. 3 and FIGS. 4 to 6, the thickness of the Au electrode seed sub-layer 32 is about 40 Å when the surface roughness Ra of the Au sub-layer 34 (data correlating to the crystal grain size of the Au sub-layer 34) sharply increases, when the resistance index of the untreated electrode layer 30 sharply decreases, and when the increase in the resistance index of the heat-treated electrode layer 30 is saturated. This result suggests that the crystal grain size of the Au sub-layer 34 correlates to a change in the resistance of the electrode layer 30. That is, the Au electrode seed sub-layer 32 increases the crystal grain size of the Au sub-layer 34, whereby the number of grain boundaries in the Au sub-layer 34 is decreased. Therefore, Cr atoms are prevented from migrating to the Au grain boundaries, whereby the electrical resistance of the electrode layer 30 is lowered and is not increased by the heat treatment.

In the above embodiment, in order to enhance the EM resistance of the Au sub-layer 34, the Cr sub-layer 35 for suppressing the electromigration is placed only on the Au sub-layer 34. However, an additional Cr sub-layer may be placed between the Au sub-layer 34 and the Au electrode seed sub-layer 32. In such a configuration that the additional Cr sub-layer is placed between the Au sub-layer 34 and the Au electrode seed sub-layer 32, that is, the Au sub-layer 34 is placed between the Cr sub-layers, it has been confirmed that the Au electrode seed sub-layer 32 has the same seed effect as that described in the above embodiment.

In the above embodiment, the Au electrode seed sub-layer 32 for increasing the crystal grain size of the Au sub-layer 34 contains NiFeCr. However, the Au electrode seed sub-layer 32 may contain NiCr or NiFe instead of NiFeCr. The reason that NiCr or NiFe can be used instead of NiFeCr is as follows: those compounds have the face-centered cubic structure (fcc structure) and lattice constants close to each other. It has been confirmed that an Au electrode seed sub-layer containing NiCr or NiFe has the same seed effect as that described in the above embodiment.

In the above embodiment, the Ta base sub-layer 31 is placed directly under the Au electrode seed sub-layer 32. However, another base sub-layer containing at least one selected from the group consisting of Zr, Hf, W, and W—Ti may be used instead of the Ta base sub-layer 31. The Au electrode seed sub-layer 32 having such a base sub-layer thereunder has the same seed effect as that described in the above embodiment.

The present invention is described above with reference to the embodiments and the drawings; however, the present invention is not limited to the embodiments and the drawings.

According to the present invention, an electrode layer includes a Ta base sub-layer, an Au electrode seed sub-layer, and an Au sub-layer disposed in that order and the Au electrode seed sub-layer contains any one of NiFeCr, NiCr, and NiFe. Therefore, crystal grains in the Au sub-layer have a large size; hence, an electrode layer including the Au electrode seed sub-layer has a smaller electrical resistance as compared with an electrode layer including no Au electrode seed sub-layer and the electrical resistance of the electrode layer including the Au electrode seed sub-layer is not increased by heat treatment.

What is claimed is:

1. An electrode layer for thin-film magnetic heads, comprising:
    a Ta base sub-layer;
    an Au sub-layer functioning as a main conductive sub-layer disposed on the Ta base sub-layer; and
    a protective sub-layer, disposed on the Au sub-layer;
    wherein an Au electrode seed sub-layer comprising NiFeCr is placed between the Ta base sub-layer and the Au sub-layer, the Au electrode seed sub-layer having a thickness of 40 to 100 Å,
    wherein a first Cr sub-layer is placed between the Au sub-layer and the protective sub-layer and a second Cr sub-layer is placed between the Au electrode seed sub-layer and the Au sub-layer, and
    wherein the Ta base sub-layer, the Au electrode seed sub-layer, Au sub-layer, the first Cr sub-layer, and the protective sub-layer are laminated sequentially in the direction of a normal with respect to a layer surface.

2. The electrode layer for thin-film magnetic heads according to claim 1, wherein the protective sub-layer contains Ta.

* * * * *